C. E. RICHARDS.
Staging-Clamps.

No. 153,280. Patented July 21, 1874.

WITNESSES:
Chas. Nida
C. Sedgwick

INVENTOR:
C. E. Richards
BY
ATTORNEYS.

UNITED STATES PATENT OFFICE.

CHARLES E. RICHARDS, OF ORANGE, MASSACHUSETTS.

IMPROVEMENT IN STAGING-CLAMPS.

Specification forming part of Letters Patent No. 153,280, dated July 21, 1874; application filed June 6, 1874.

*To all whom it may concern:*

Figure 1:
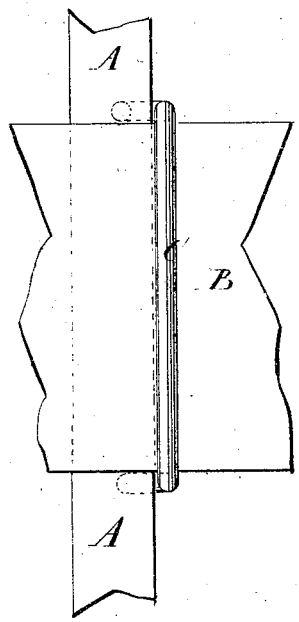
Figure 1:
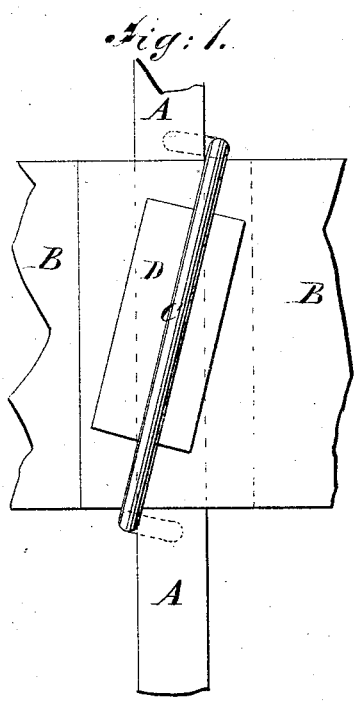
Figure 1:
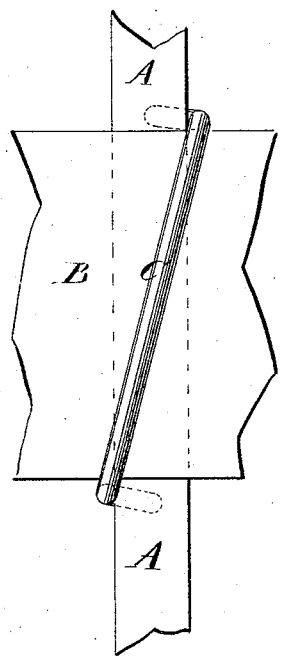
Figure 2:
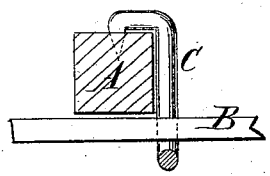
Figure 2:
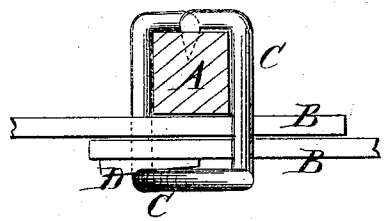
Figure 2:
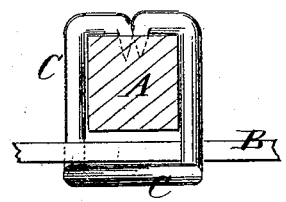
Figure 3:
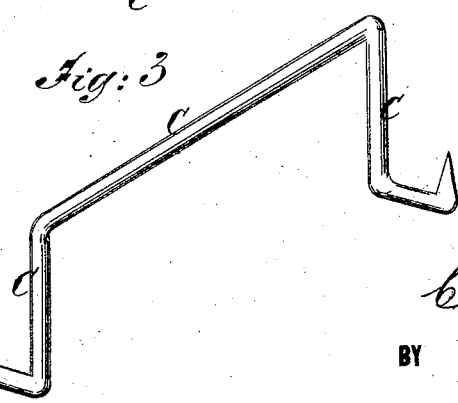

Be it known that I, CHARLES E. RICHARDS, of Orange, in the county of Franklin and State of Massachusetts, have invented a new and useful Improvement in Staging Clamp, of which the following is a specification:

Figure 1 is a front view of my improved clamps, shown as applied to the ledger-boards and poles of a scaffold. Fig. 2 is a top view of the same, the poles being shown in section. Fig. 3 is a perspective view of one of the clamps.

Similar letters of reference indicate corresponding parts.

My invention has for its object to furnish improved clamps for securing the ledger-boards to the poles in forming scaffolds for masons, carpenters, &c., which will hold them more securely than nails, and will not injure them, so that the scaffold can be taken down and put up any desired number of times, being equally strong each time.

The invention will first be fully described, and then pointed out in the claim.

A represents the poles, and B the ledger-boards, of a scaffold, about the construction of which parts there is nothing new. C are the clamps, which are made of iron rods one-half inch, more or less, in diameter. The bodies of the clamps are made of a length equal to the breadth of the ledger-boards and are bent at right angles to pass across the edges of the ledger-boards B, and the sides of the poles A are bent again at right angles to overlap the outer side of the poles A, and their ends are bent inward at right angles, and are made sharp so as to be driven into the said outer sides of the poles A. The clamps C are arranged diagonally across the inner side of the poles A, and their ends are bent inward in opposite directions to overlap the outer side of the poles A from the opposite sides, so that the strain will come against the said poles. The clamps for the corner-poles are made straight, and their ends are bent in the same direction. The ledger-boards B are kept from slipping in the clamps C by wedges D driven between their bodies and the ledger-boards B.

By this construction the scaffold is put up without the use of nails, so that the lumber is not injured, and can be used over and over again.

Having thus described my invention, I claim as new and desire to secure by Letters Patent—

The combination of poles A, boards B, clamps C, and wedges D, in the manner and for the purpose specified.

CHARLES E. RICHARDS.

Witnesses:
    C. T. HOWARD,
    R. D. CHASE.